United States Patent [19]

Tanaka et al.

[11] Patent Number: 4,525,158
[45] Date of Patent: Jun. 25, 1985

[54] BELT-PULLEY DRIVE MECHANISM

[75] Inventors: Hideki Tanaka; Masanori Kamimura; Koji Horikawa; Katsuyuki Kawasaki, all of Hiroshima, Japan

[73] Assignee: Mazda Motor Corporation, Hiroshima, Japan

[21] Appl. No.: 563,611

[22] Filed: Dec. 20, 1983

[30] Foreign Application Priority Data

Dec. 21, 1982 [JP] Japan .................. 57-225562

[51] Int. Cl.³ .............................. F16H 7/02
[52] U.S. Cl. .................. 474/167; 474/170; 474/252
[58] Field of Search .......... 474/153, 169, 170, 167, 474/168, 252

[56] References Cited

U.S. PATENT DOCUMENTS 3,851,535 12/1974 Presentey ................. 474/167

FOREIGN PATENT DOCUMENTS 536888 2/1957 Canada ..................... 474/170
2910871 9/1980 Fed. Rep. of Germany ...... 474/153
585983 3/1925 France ..................... 474/167
55-10135 1/1980 Japan .
1052264 12/1966 United Kingdom ............ 474/167

Primary Examiner—James A. Leppink
Assistant Examiner—Frank H. McKenzie, Jr.
Attorney, Agent, or Firm—Fleit, Jacobson, Cohn & Price

[57] ABSTRACT

A belt-pulley drive mechanism comprising a pulley having a plurality of circumferentially extending grooves of V-shaped cross-sectional configuration, a belt adapted to be passed around the pulley and stretched under tension so that the belt is engaged with the pulley in torque transmitting relationship, the belt being formed with a plurality of longitudinally extending ridges of V-shaped cross-sectional configuration which are adapted to be engaged with the grooves in the pulley when the tension is applied to the belt. The grooves or the ridges or both are formed in a cross-section along a concave line so that a clearance is formed between the pulley and the belt when the tension is removed from the belt, the clearance being larger at a transversely central portion than at side edge portions.

9 Claims, 6 Drawing Figures

BELT-PULLEY DRIVE MECHANISM

The present invention relates to a belt-pulley drive mechanism and more particularly to a belt-pulley drive mechanism having intermeshing triangular grooves and protuberancies.

In a belt-pulley mechanism, it has been known to provide the pulley with a plurality of circumferentially extending grooves of V-shaped cross-section and the belt with a corresponding number of lengthwisely extending protuberancies of V-shaped cross-section so that the protuberancies on the belt are engaged with the grooves in the pulley in torque transmitting relationship. As an example, Japanese laid-open Pat. No. 55-10135 laid open to public inspection on Jan. 24, 1980 discloses this type of drive mechanism. In this type of belt-pulley transmission, it has been experienced that the contact pressure between the belt and the pulley changes in the widthwise direction of the belt. In fact, at the side edge portions, the belt is engaged with the pulley with a lower contact pressure than at the central portion since the longitudinal elongation under tension of the belt is larger in the side edge portion than in the central portion. This difference in the contact pressure causes a slip of the belt with respect to the pulley at the side edge portion often producing a squeaking noise. Further, it is apparent that such difference in the contact pressure results in a decrease in power transmitting capacity of the drive mechanism.

It is therefore an object of the present invention to provide a belt-pulley drive mechanism in which the belt can be engaged with the pulley with a substantially uniform contact pressure throughout the width of the belt.

Another object of the present invention is to provide a belt-pulley drive mechanism in which the torque transmitting capacity is increased.

A further object of the present invention is to provide a belt-pulley drive mechanism in which the squeaking noise can be eliminated by preventing the slip between the belt and the pulley.

According to the present invention, the above and other objects can be accomplished by a belt-pulley drive mechanism comprising a pulley having a plurality of circumferentially extending grooves of V-shaped cross-sectional configuration, a belt adapted to be passed around the pulley and stretched under tension so that the belt is engaged with the pulley in torque transmitting relationship, said belt being formed with a plurality of longitudinally extending ridges of V-shaped cross-sectional configuration which are adapted to be engaged with said grooves in said pulley when the tension is applied to the belt, at least one of said grooves and said ridges being formed in a cross-section along a concave line so that a clearance is formed between the pulley and the belt when the tension is removed from the belt, said clearance being larger at a transversely central portion than at side edge portions. According to the features of the present invention, when the tension is applied to the belt, the belt is engaged with the pulley under a substantially uniform pressure throughout the width of the belt. The present invention is particularly applicable to a crank pulley mechanism having a pulley secured to an engine crankshaft and engaged with a belt for driving various types of accessories. In this mechanism a relatively high torque is transmitted so that there is a high possibility of slip being produced. However, the present invention is not limited to such application.

The above and other objects and features of the present invention will become apparent from the following descriptions of preferred embodiments taking reference to the accompanying drawings, in which.

Figure 1:
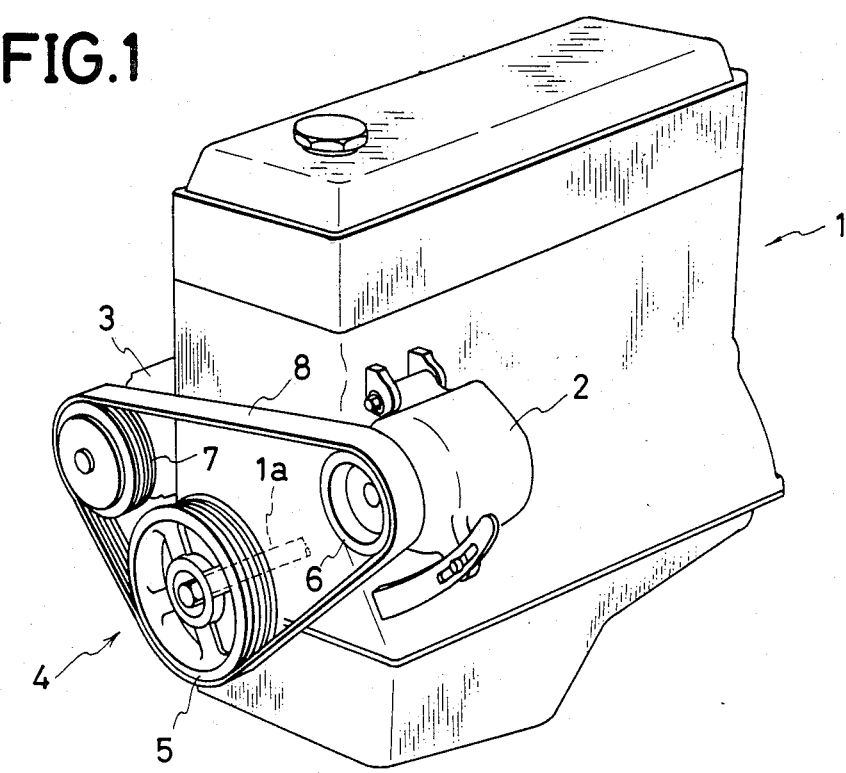
FIG. 1 is a perspective view of an engine having a belt-pulley drive mechanism in accordance with one embodiment of the present invention.

Referring now to the drawings, particularly to FIG. 1, there is shown an automobile engine 1 having a crankshaft 1a. The engine 1 has a power steering hydraulic pump 2 and a cooler compressor 3 which are mounted thereon. A belt-pulley drive mechanism 4 is provided for driving the pump 2 and the compressor 3. The driving mechanism 4 includes a pulley 5 secured to the engine crankshaft 1a and pulleys 6 and 7 respectively attached to the drive shafts of the pump 2 and the compressor 3. A belt 8 is provided to pass around the pulleys 5, 6 and 7 so that the driving power of the engine crankshaft 1a is transmitted to the drive shafts of the pump 2 and the compressor 3.

Figure 2:
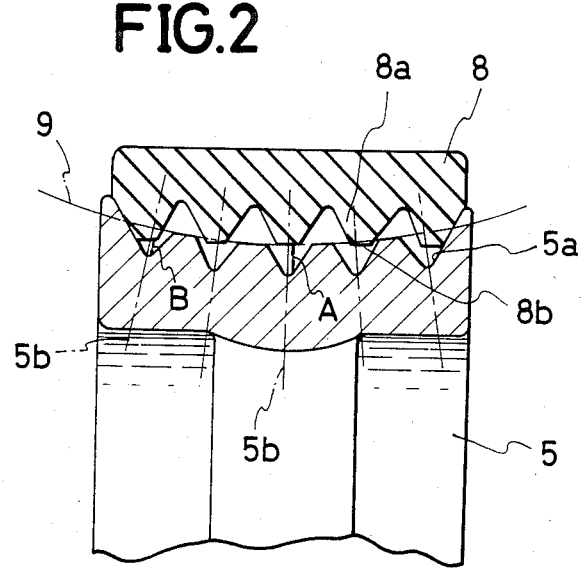
FIG. 2 is a fragmentary cross-sectional view taken across the crank pulley in the embodiment shown in FIG. 1 but with the belt relieved of tension.

Referring to FIG. 2, it will be noted that the pulley 5 mounted on the engine crankshaft 1a is formed at the outer periphery with a plurality of circumferentially extending grooves 5a. The belt 8 is formed at the inner surface with a plurality of longitudinally extending ridges 8a which are adapted for engagement respectively with the grooves 5a. It should particularly be noted in FIG. 2 that the ridges 8a are formed substantially coplanar so that the crests 8b of the ridges 8a lie in a plane when the belt 8 is relieved of tension and the ridges 8a have substantially the same height, however, the grooves 5a in the outer periphery of the pulley 5 are formed along a concave line 9 in an axial cross-section of the pulley 5. Thus, as regards the bisector lines 5b of the grooves 5a, the lines 5b of the sideward grooves 5a are inclined axially inwardly as compared with those of central grooves 5a. Further, when the belt 8 is free from tension, the clearance A at the central groove 5a and the crest 8b of the ridge 8a is larger than the clearance B at the sideward groove 5a.

Figure 3:
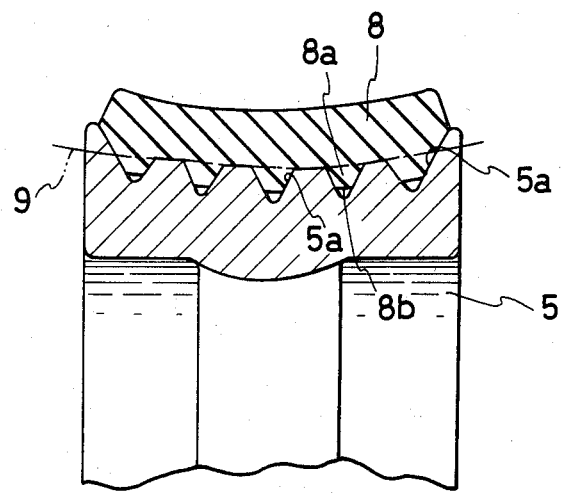
FIG. 3 is a fragmentary cross-sectional view similar to FIG. 2 but showing the belt under tension.

When a tension is applied to the belt 8, the belt 8 is deformed as shown in FIG. 3 so that the ridges 8a on the belt 8 are engaged with respective ones of the grooves 5a. Since the belt 8 is deformed along the curved line 9 in which the grooves 5a lie, the tensile stress in the side edge portions of the belt 8 is relatively increased so that the tensile stress in the belt 8 can be uniformized throughout the width of the belt 8. Thus, it becomes possible to prevent slip of the belt 8 with respect to the pulley 5 at the side edge portion of the belt 8.

Figure 4:
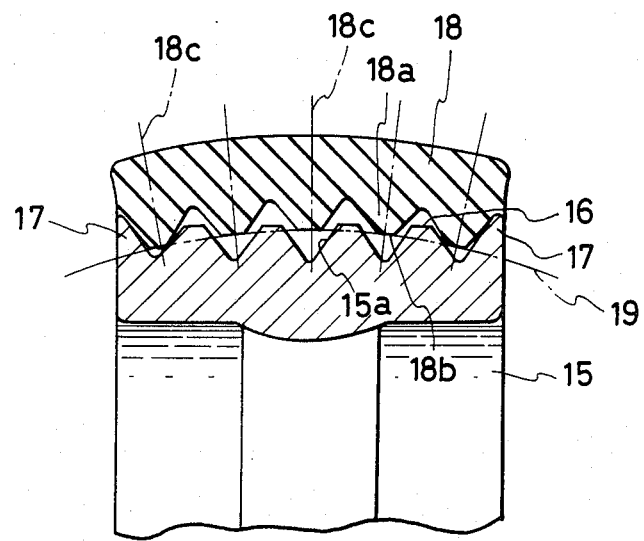
FIG. 4 is a cross-sectional view similar to FIG. 2 but showing another embodiment.
Figure 5:
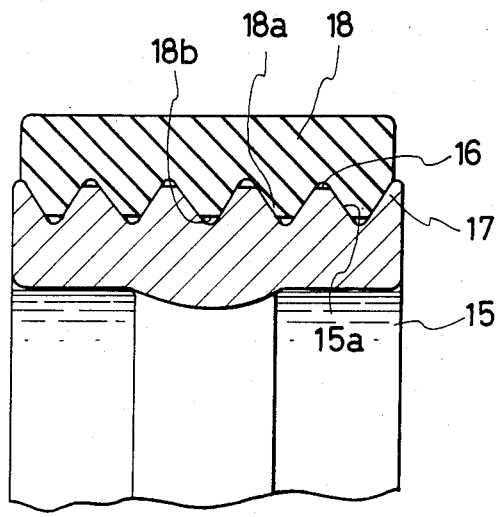
FIG. 5 is a cross-sectional view of the belt-pulley drive mechanism but with the belt under tension; and, FIG. 6 is a cross-sectional view similar to FIGS. 2 and 4 but showing a further embodiment.

Referring to FIG. 4, there is shown another embodiment of the present invention. In this embodiment, the pulley 15 has an outer periphery 16 of a substantially cylindrical configuration which is formed at the opposite axial ends with side rims 17. On the cylindrical outer periphery 16, there are formed a plurality of grooves 15a which are therefore formed to lie along a substantially straight line. The belt 18 is of a substantially arcuate cross-section having a concave inner surface in which a plurality of ridges 18a are formed. Thus, the crests 18b of the ridges 18a lie along a curved line 19. Each ridge 18a has a center line 18c. In sideward ridges 18a, the line 18c is inclined axially outwardly of the pulley 15 so that the inclination angle in the outermost ridges 18a is larger than in the inner ridges 18a. When a tension is applied to the belt 18, the belt 18 is deformed as shown in FIG. 5 so that the ridges 18a on the belt 18 are engaged with the grooves 15a in the pulley 15. This deformation of the belt 18 is effective to produce a substantially uniform tensile stress distribution throughout the width of the belt 18.

Figure 6:
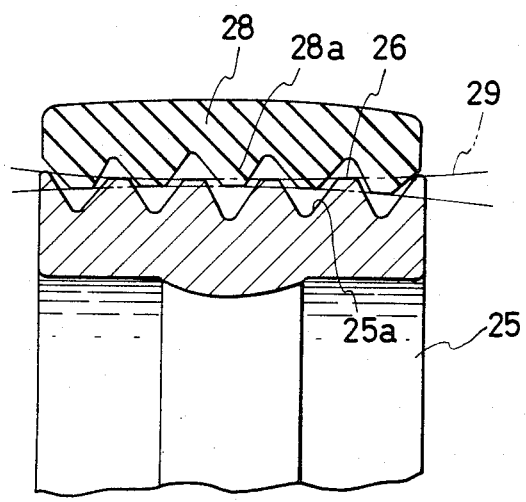

In FIG. 6, there is shown a further embodiment of the present invention in which the pulley 25 has an outer periphery 26 of a concave configuration. On the outer periphery 26 of the pulley 25, there are formed a plurality of grooves 25a which are therefore lying along a concave line 29 in an axial section of the pulley 25. The belt 28 is of a substantially arcuate cross-section having a concave inner surface in which a plurality of ridges 28a are formed. The crests 28b of the ridges 28a lie along a curved line 29a in FIG. 6. When a tension is applied to the belt 28, it is deformed so that the ridges 28a thereon are engaged with the grooves 25a in the pulley 25 and a substantially uniform tensile stress distribution can be established throughout the width of the belt 28.

The invention has thus been shown and described with reference to specific embodiments, however, it should be noted that the invention is in no way limited to the details of the illustrated structures but changes and modifications may be made without departing from the scope of the appended claims.

We claim:

1. A belt-pulley drive mechanism comprising a pulley having a plurality of circumferentially extending grooves of V-shaped cross-sectional configuration, a belt adapted to be passed around the pulley and stretched under tension so that the belt is engaged with the pulley in torque transmitting relationship, said belt being formed with a plurality of longitudinally extending ridges of V-shaped cross-sectional configuration which are adapted to be engaged with said grooves in said pulley when the tension is applied to the belt, at least one of said grooves and said ridges being formed in a cross-section along a concave line so that a clearance is formed between the pulley and the belt when the tension is removed from the belt, said clearance being larger at a transversely central portion than at side edge portions.

2. A belt-pulley drive mechanism in accordance with claim 1 in which said pulley has an outer periphery of concave axial cross-section, said grooves being formed on said outer periphery so that the grooves lie along a concave line.

3. A belt-pulley drive mechanism in accordance with claim 2, in which said grooves are formed in the pulley so that a bisector line of a sideward groove is axially inwardly inclined by a larger angle than that of a central groove.

4. A belt-pulley drive mechanism in accordance with claim 3 in which said pulley is a drive pulley connected with a drive shaft of a prime mover.

5. A belt-pulley drive mechanism in accordance with claim 2 in which said pulley is a drive pulley mounted on a crankshaft of an automobile engine.

6. A belt-pulley drive mechanism in accordance with claim 5 in which said pulley is connected through said belt with further pulleys for driving a plurality of accessories.

7. A belt-pulley drive mechanism in accordance with claim 1 in which said belt has an inner surface of concave cross-section, said ridges being formed in said inner surface so that the ridges lie along a concave line.

8. A belt-pulley drive mechanism in accordance with claim 7 in which said ridges have center lines, the center lines in sideward ridges being inclined axially outwardly of the pulley so that inclination angles of the center lines in sidewardly outside ridges are larger than those of sidewardly inside ridges.

9. A belt-pulley mechanism in accordance with claim 1 in which said pulley has an outer periphery of concave axial cross-section, said grooves being formed on said outer periphery so that the grooves lie along a concave line, said belt having an inner surface of concave cross-section, said ridges being formed in said inner surface so that the ridges lie along a concave line.

* * * * *